United States Patent Office 3,002,991
Patented Oct. 3, 1961

3,002,991
SEMINITRILE ESTERS OF BETA-HYDROMUCONIC ACID

Francesco Minisci and Ugo Pallini, Milan, Italy, assignors to Montecatini Soc. Gen. per l'Industria Mineraria e Chimica, Milan, Italy
No Drawing. Filed Feb. 3, 1959, Ser. No. 790,821
Claims priority, application Italy June 12, 1958
2 Claims. (Cl. 260—465.4)

This invention relates to a method of preparing seminitrile esters of beta-hydromuconic acids.

It is known that esters of beta-hydromuconic acid seminitrile are suitable intermediaries for preparing by catalytic hydrogenation derivatives of epsilon-aminocaproic acid, which are particularly valuable in the field of polyamide fibers.

It is known that esters of beta-hydromuconic acid seminitrile, such as the ethyl ester can be obtained by the reaction (1) $CH_2=CH-CH=CH-COOC_2H_5+HCN \rightarrow$
$NC-CH_2-CH=CH-CH_2-COOC_2H_5$ This invention relates to the preparation of esters of beta-hydromuconic acid seminitrile by monoalcoholysis of 1,4-dicyano-2-butene in the presence of alcohol, water and an inorganic acid by the following process.

(2) $NC-CH_2-CH=CH-CH_2-CN+ROH+H_2O \rightarrow$
$\rightarrow NC-Cl_2-CH=CH-CH_2-COOR+NH_3$ wherein R= is an alkyl radical containing 1 to 5 C-atoms.

A method is known by which the ethyl ester of beta-hydromuconic acid seminitrile is obtained starting from 1,4-dicyano-2-butene.

This method is carried out in two steps, the first step forming the chloride of the imino-ether which is hydrolyzed in the next step to the cyano-ester. However, this method is not practicable on account of the fact that reaction should be carried out under anhydrous conditions in the presence of an inert solvent.

The improved method of this invention has considerable advantages and provides an ester of beta-hydromuconic acid seminitrile in a one step operation in an alcoholic-aqueous medium starting from 1,4-dicyano-2-butene.

According to said method 1,4-dicyano-2-butene is reacted with an alcohol in the presence of suitable quantities of mineral acids, such as sulphuric acid, hydrochloric acid and water at a temperature ranging between 50 and 150° C.

Hemialcoholysis of dinitriles, which has been known, per se, for some time, necessitates special precautions for use in connection with 1,4-dicyano-2-butene.

A method is known for instance, of hemialcoholysis of saturated dinitriles. By effecting according to this method hemialcoholysis of 1,4-dicyano-2-butene conversions are obtained which are inferior by 50% to those obtained in the case of the corresponding saturated product by the known method mentioned above. Yields also are considerably lower.

It will therefore be seen, that when effecting monoalcoholysis of 1,4-dicyano-2-butene reaction conditions other than those known heretofore should be provided in order to obtain high yields of the ester of beta-hydromuconic acid seminitrile.

We have ascertained that, in addition to the main reaction indicated above at (2) secondary reactions are apt to take place as follows:

(a) $NC-CH_2-CH=CH-CH_2-CN+2ROH+2H_2O \rightarrow$
$\rightarrow ROOC-CH_2-CH=CH-CH_2-COOR+2NH_3$ (b) $NC-CH_2-CH=CH-CH_2-CN+4H_2O \rightarrow$
$\rightarrow HOOC-CH_2-CH=CH-CH_2-COOH+2NH_3$ (c) $NC-CH_2-CH=CH-CH_2-CN+2H_2O \rightarrow$
$\rightarrow NC-CH_2-CH=CH-CH_2-COOH+NH_3$ As far as reaction (a) is concerned we have ascertained that the formation of the diester is closely connected with conversions. The higher the conversions, the greater the quantity of diester. Total conversions of dinitrile yield, for instance, over 40% diester, the cyanoester output being consequently obviously a low one.

Reaction (b) is affected by two factors, namely conversion and water/mineral acid ratio. High conversions and a high water/mineral acid ratio improve the formation of the dicarboxylic acid, which is undesirable. Therefore, conversions should be limited and a low water/mineral acid ratio should be maintained in connection with reaction (b) too.

Reaction (c) is decisively affected by the water/mineral acid ratio. In order to minimize formation of undesired cyano acid, the said ratio should be kept as low as possible.

We have also ascertained that during the period of reaction, temperature, and ratios of the reagents considerably affect the progress of reaction. In order to reduce formation of diester and reach high cyano-ester outputs, conversions of 1,4-dicyano-2-butene should be limited to a value not exceeding 50%. Conversion values ranging between 15% and 30% have been found preferable. To this end, acid/dinitrile molar ratio of 0.20–0.45, water/dinitrile molar ratio of 0.20–0.50, and alcohol/dinitrile molar ratio of 1.5–3 should be employed.

When operating at room pressure the boiling temperature materially affects the time of the reaction which should be stopped at the proper moment according to the alcohol employed for effecting the desired conversion. Reaction times range with the above mentioned ratios between 30 minutes with butanol to 3 hours with methanol.

On the other hand the use of very low conversions was made possible in that we ascertained the operative conditions under which recovery of unreacted dicyanobutene from the reaction mixture is very easily effected. According to this method the reaction mixture is conveniently cooled, unreacted dinitrile is filtered off and almost quantitatively crystallizes, the crystallization mother-liquor is subjected after a moderate alkaline washing step to fractional distillation through which the cyano-ester is obtained and further dicyano-butene is recovered.

Through a thorough study of the optimum values of the ratios of the main factors of the reaction, such as low conversions, low water/mineral acid ratio, and development of an efficient quantitative method of recovering unreacted dinitrile from the reaction mixture, we provide a simple method by which high yields of esters of beta-hydromuconic acid seminitrile can be obtained starting from 1,4-dicyano-2-butene.

Examples of how to carry out the improved method are given hereafter merely by way of illustration, without implying any limitation of the improved method.

Example 1

106 g. 1,4-dicyano-2-butene are dissolved in 48 g. methanol containing 3.5 g. water. The solution is admixed while stirring with 25.5 g. 96% sulphuric acid and is boiled for three hours, the temperature of the liquid being 90°. Upon cooling the mineral salt is separated from the unreacted dinitrile (gr. 77.4) by filtering off and washing with water. The filtrate is subjected to fractional distillation after moderate washing by means of aqueous bicarbonate. The result is 26.4 g. methyl cyano-ester boiling at 92–94°/0.8. The distillation residue is 6.7 g. dicyano-butene.

Example 2

The method is carried out as described in Example 1 with the difference that the acid/dinitrile ratio is 0.33.

The result is 38.2 g. methyl cyano-ester, 72 g. dicyano-butene being recovered.

Example 3

The method is carried out under the same conditions as described in Example 1, ethyl alcohol being used instead of methyl alcohol, the reaction being stopped after 2 hours. Temperature of the reaction mixture is 97–100°. The result is 28.9 ethyl cyano-ester, boiling point 92–95°/0.5, 85 g. dicyano-butene being recovered.

Example 4

The method is carried out under the same conditions as described in Example 2, isopropyl alcohol being employed instead of methyl alcohol. The temperature of the reaction mixture is 98–95°. The result is 23.3 g. isopropyl cyano-ester, boiling point 92–96°/0.7, 86.7 g. dicyano-butene being recovered.

Example 5

The method is carried out as in Example 1 with the difference that n-butyl alcohol is employed instead of methyl alcohol, the reaction being stopped after 40 minutes. Temperature of the mixture is 120°. The result is 37.3 butyl cyano-ester, boiling point 115–120°/0.7, 81.5 g. dicyano-butene being recovered.

What we claim is:

1. Method of manufacturing an alkyl ester of beta-hydromuconic acid seminitrile comprising reacting 1,4-dicyano-2-butene with an alkyl alcohol containing at most five carbon atoms at a temperature ranging between 50° and 150° C. in an aqueous medium containing a member selected from the group consisting of sulphuric acid and hydrochloric acid, while employing a 0.2–0.45 acid/dinitrile molar ratio, a 0.2–0.5 water/dinitrile molar ratio and a 1.5–3 alcohol/dinitrile molar ratio, stopping the reaction at a positive conversion value not exceeding 50% based upon 1,4-dicyano-2-butene by cooling the reaction mixture below said temperature, thereby crystallizing unreacted dinitrile in the mixture, recovering the crystallized dinitrile, and recovering the alkyl ester from the crystallization mother-liquor by fractional distillation.

2. Method of manufacturing an alkyl ester of beta-hydromuconic acid seminitrile comprising reaction 1,4-dicyano-2-butene with an alkyl alcohol containing at most five carbon atoms at a temperature ranging between 50° and 150° C. in an aqueous medium containing a member selected from the group consisting of sulphuric acid and hydrochloric acid, while employing a 0.2–0.45 acid/dinitrile molar ratio, a 0.2–0.5 water/dinitrile molar ratio and a 1.5–3 alcohol-dinitrile molar ratio, stopping the reaction at a positive conversion value of 15% to 30% based upon 1,4-dicyano-2-butene by cooling the reaction mixture below said temperature, thereby crystallizing unreacted dinitrile in the mixture, recovering the crystallized dinitrile, and recovering the alkyl ester from the crystallization mother-liquor by fractional distillation.

References Cited in the file of this patent

UNITED STATES PATENTS 2,322,273   Biggs _____ June 22, 1943